ÒUnited States Patent [19]

Ustick

[11] 3,719,583
[45] March 6, 1973

[54] APPARATUS FOR THE SEPARATION OF IONS FROM SOLUTION

[76] Inventor: Daniel D. Ustick, 20024 Goddard Street, Detroit, Mich. 48234

[22] Filed: July 6, 1970

[21] Appl. No.: 52,615

[52] U.S. Cl...............204/301, 204/180 R, 204/149, 204/151, 204/309, 210/42, 210/222
[51] Int. Cl...........B01k 5/00, C02b 1/82, B01k 1/00
[58] Field of Search..............204/299, 149, 151, 301; 210/42, 222, 223

[56] References Cited

UNITED STATES PATENTS

| | | | |
|---|---|---|---|
| 3,140,714 | 7/1964 | Murphy, Jr. et al. | 128/214 |
| 3,207,684 | 9/1965 | Dotts, Jr. | 204/180 R |
| 3,368,968 | 2/1968 | Ruskin | 210/42 |
| 2,825,464 | 3/1958 | Mack | 210/222 |
| 3,441,488 | 4/1969 | Onstott | 204/149 |
| 3,522,162 | 7/1970 | Davies | 204/180 R |

OTHER PUBLICATIONS

Ellis, "Fresh Water from the Ocean," pp. 61–65, TD 430 E49 C.5 (1954)
Robinson et al., "Electrolyte Solutions," p. 118, QD 561 R6 (1959)
Nernst, "Theoretical Chem.," p. 321, QD 453 N43 tE (1895)
Moore, "Physical Chemistry," Prentice–Hall, 1963, pp. 334, 345, 351, 357, 359, & 360

Primary Examiner—John H. Mack
Assistant Examiner—A. C. Prescott
Attorney—Barthel & Bugbee

[57] ABSTRACT

An ionized solution or electrolyte, such as sea water, is caused to flow through a conduit while passing through a magnetic field produced between magnets of opposite polarity disposed in spaced relationship adjacent opposite wall portions of the conduit. Extending between these magnets are two spaced opposite conduit wall portions of electrically non-conducting porous material, such as porous ceramic material, through the pores of which the positive and negative ions in a solution such as sea water can pass. When subjected to the magnetic field extending between the magnets, the positive and negative ions are deflected laterally away from each other in opposite directions toward the porous walls, and are expelled from the conduit through the pores. The opposite but approximately parallel flow of positive and negative ions through this transverse magnetic field generates an electric current density, a very large percentage of which passes through the faces of the conduit's porous walls. The magnitude of the current density flowing out from the pores of the conduit and into the external medium is a measure of the relative concentration of salt water undergoing desalinization by passing constituent ions (in this case from a salt water solution) through the conduit. If there is no measurable current density at a station downstream along the conduit adjacent the external side of its porous walls, the deionized water leaving the outlet orifice of the conduit is essentially free from salts.

To prevent external ions from entering the conduit through its porous walls by diffusion or otherwise, fluid adjacent the porous walls inside and outside the conduit should maintain parallel flow. An ionized solution, such as sea water, flowing past the pores outside the conduit faster than the partially deionized solution inside the conduit will produce a Venturi suction which draws off some of the processed solution of lowered salinity through the pores into the outside flow stream. This forms a thin boundary layer of lowered salinity along the external porous surface of the conduit which assists in preventing the external ion intrusion mentioned above. An internal over-pressure sustained by a dynamic flow pressure along the external porous surface balances any hydrostatic pressure tending to force ions back into the conduit.

To minimize the outward expansion of the external magnetic field generated by the device and its components, the magnets on opposite sides of the conduit are preferably arranged in a series with alternating polarities on each side. Ferromagnetic materials with high magnetic permeability, such as soft silicon steel, are used to provide an easy magnetic flux path for an otherwise open magnetic circuit external to the conduit. Minimizing the external magnetic field is desirable because this field acts to drive ions back into the device and is a source of inefficiency during operation. The magnets are preferably permanent magnets but may alternatively be electromagnets.

A modification of FIG. 3 (FIGS. 5 and 6) provides a barrier between the bodies of flowing electrolyte within the outer conduit and also provides gas escape ports in the upper wall of the outer conduit. The barrier is composed of electrically conducting walls separated from one another by an electrically insulating layer, and conductors electrically connected to these walls carry off current generated in operation and which may be used to actuate electrical devices in external circuits.

4 Claims, 6 Drawing Figures

United States Patent [19]
Ustick
[11] 3,719,583
[45] March 6, 1973
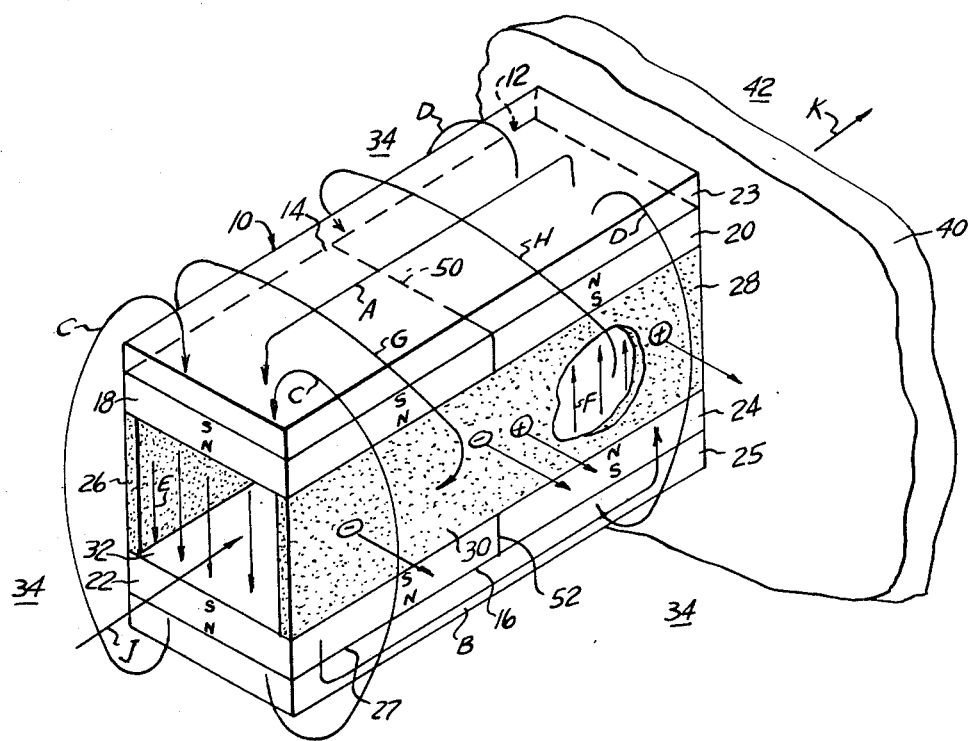

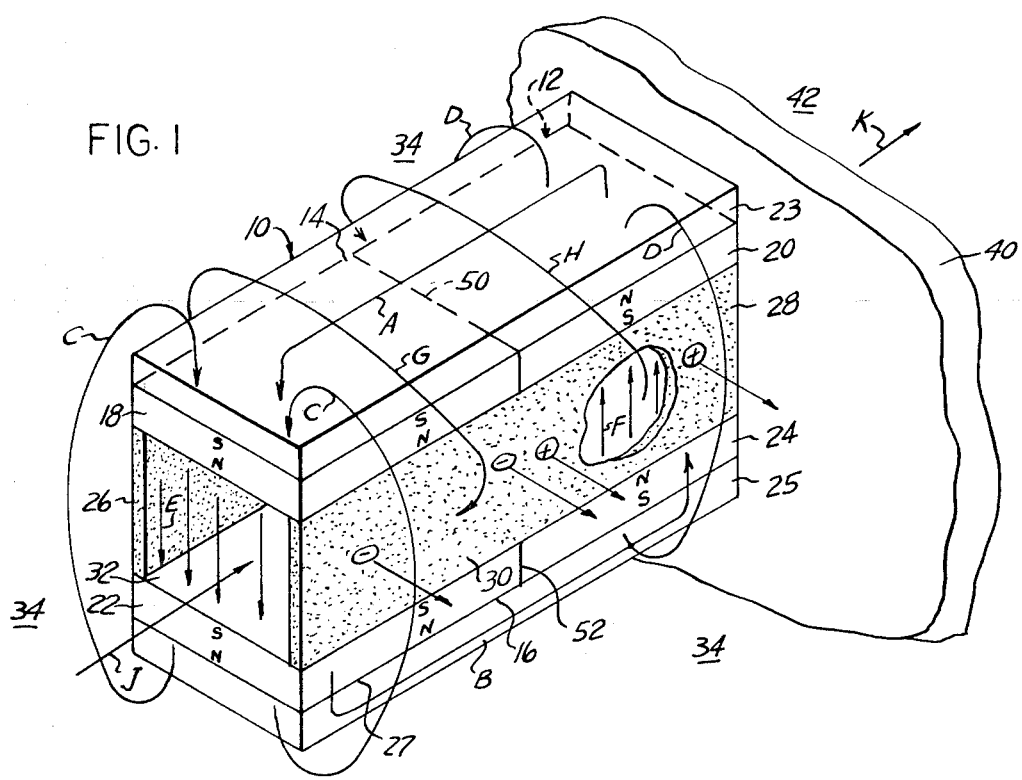

INVENTOR
DANIEL D. USTICK

BY Barthel & Bugbee
ATTORNEYS

APPARATUS FOR THE SEPARATION OF IONS FROM SOLUTION

In the drawings,

FIG. 1 is a perspective view of a portion of an apparatus for the separation of ions from a solution such as an electrolyte, according to one form of the invention, employing permanent magnets, and wherein the solution flows into the conduit directly from a body thereof, such as salt water;

FIG. 2 is a central horizontal section through the apparatus shown in FIG. 1 diagrammatically indicating the direction of ion travel;

FIG. 3 is a central horizontal section through a modified ion separation apparatus wherein the solution flow is through an outer conduit surrounding the inner conduit containing the solution under ion separation;

Figure 6:
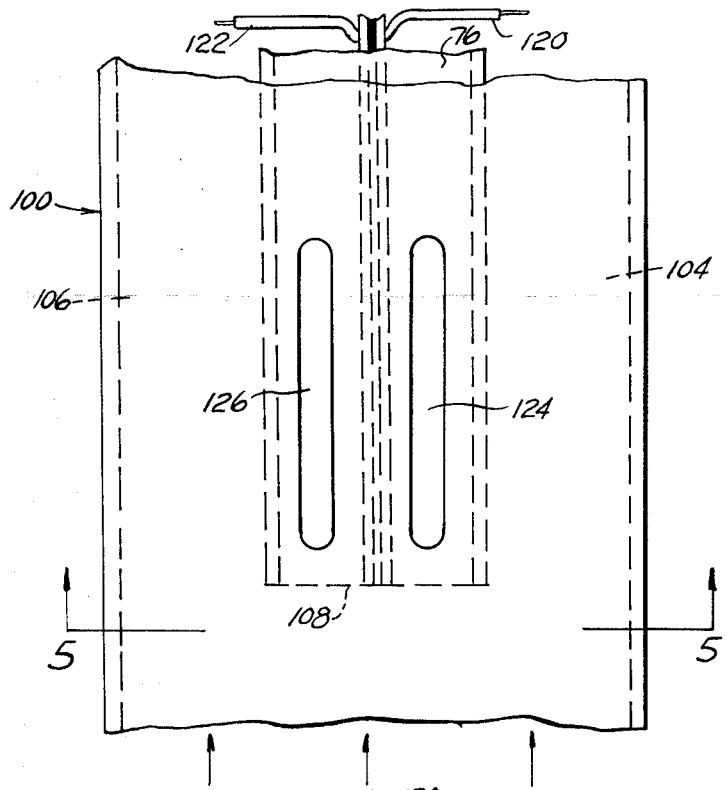
FIG. 6 is a top plan view of a length of the still further modified device of FIG. 5.

Referring to the drawings in detail, FIGS. 1 and 2 show an ion separation or desalinization apparatus, generally designated 10, consisting of a conduit 12 of rectangular cross-section having upper and lower walls 14 and 16 respectively containing upstream and downstream permanent magnets 18 and 20 on the upper side and upstream and downstream permanent magnets 22 and 24 on the lower side thereof.

Disposed externally of and adjacent the magnets 22 and 24 are field-restricting plates 23 and 25 of ferromagnetic material which provide easy flux for the magnetic lines of force and confine the external magnetic field substantially therein and minimize its outward expansion which would reduce the efficiency of the apparatus 10. The magnets 18, 20, 22 and 24 and the plates 23 and 25 are preferably of ceramic magnetic material, such as ceramic barium ferrite. Such ceramic materials are electrically non-conducting hence are not as readily attacked by the solutions because they will not transmit the currents generated by the ions moving in the magnetic field. They also possess a high coercivity, producing very stable magnetic fields.

The two remaining opposite side walls 26 and 28 are of porous material, such as porous ceramic material, for example unglazed porcelain, having minute pores indicated diagrammatically at 30 through which the ions of dissociated salt water can readily pass. These ions are indicated by tiny circles bearing positive and negative signs. The conduit 12 has an inlet opening 32 from a salt water space 34 indicated at the left-hand side of FIG. 1 and an outlet opening 36 communicating with an outlet opening 38 in an impermeable bulkhead or partition wall 40 to which the conduit 12 is attached and which excludes the salt water from the desalinized water space 43 downstream from the outlet opening 38.

From FIG. 1 it will be seen that the adjacent upstream and downstream magnets 18 and 20 on the upper side of the conduit 12 have opposite polarities on their upper and lower surfaces, and a similar relationship exists between the upstream and downstream magnets 22 and 24 on the lower side of the conduit 12 also for the purpose of reducing the outward spread of the external magnetic field. The flux of the external magnetic field is indicated by the arrows designated A and B for the longitudinal external magnetic lines of force and C and D for the transverse external magnetic lines of force. The lines of force of the internal magnetic field between the upstream opposite magnets 18 and 22 are indicated by the reference letter E, whereas those between the downstream opposite magnets 24 and 20 are indicated by the reference letter F, the flow of the magnetic flux being of course in opposite directions because of the opposite arrangement of the magnetic poles. The corresponding electric field is indicated by the arrow G for the upstream magnets 18 and 22 and by the arrow H for the downstream magnets 20 and 24. From the location of the arrow heads of the arrows G and H it will be seen that the electric field is disposed in opposite directions, just as the opposite locations of the arrows heads C and D as well as E and F show opposite directions of the magnetic flux.

In the operation of the ion separation apparatus 10 of FIGS. 1 and 2, let it be assumed that it is to be used for the desalinization of salt water, such as sea water, which occupies the space 34 to the left of the bulkhead 40 and that the space to the right thereof is sealed off from the salt water space 34 so that no water flow takes place therebetween except through the passageway 44 extending through the conduit 12. Let it also be assumed that incoming salt water is caused to flow in the direction of the arrow J through the inlet opening 32 and through the conduit passageway 44 and thence, after desalinization through the outlet openings 36 and 38 into the desalinized water space 42. Consider, for example, the behavior of the sodium chloride ions in the salt water. As the salt water flows through the passageway 44, the positive sodium ions and the negative chloride ions into which the sodium chloride dissociates in water solution are subject to the action of the electromagnetic field, in accordance with the laws of magnetohydrodynamics, as indicated by the arrows lettered E and F for the magnetic field provided by the magnets 14 and 16 and G and H for the electric current resulting from the flow of ions through that magnetic field, whereby the positive sodium ions and negative chloride ions are deflected laterally in opposite directions. At the same time, the flow of water through the conduit 12 is retarded by the effect of the magnetic flux in performing the ion separation and deflection. As a consequence, the positive sodium ions in the space 46 between the magnets 18 and 22 are expelled through the pores of the side wall 26, whereas the negative chloride ions therein are expelled through the pores of the opposite side wall 28 back into the salt water space 34.

From the space 46 between the magnets 18 and 22, the partly desalinized water containing the remaining sodium and chloride ions passes into the space 48 between the oppositely arranged magnets 20 and 24 past the boundary surfaces 50 and 52 respectively between the two sets of opposed magnets. The electric field now acts in the opposite direction as indicated by the arrow H (FIG. 1), causing the positive sodium ions to be expelled through the porous side wall 28 while the negative chloride ions are now expelled through the pores in the porous side wall 26. As a result, the water flowing outward in the direction of the arrow K possesses a reduced salinity to the extent that it is designated fresh water. The amount of desalinization for a satisfactory result will of course depend on the subsequent use for which the water is intended. Water for bathing, drinking and laundry purposes may possess a much higher salinity than boiler feed water, which must possess negligible salinity in order to avoid corrosion of the boiler tubes. It will be understood that the apparatus 10 shown in FIG. 1 may be arranged in cascade so as to subject water of already lowered salinity to further desalinization steps and thus meet varying requirements of minimum salinity for the fresh water finally obtained in the space 42.

The modified desalinization apparatus, generally designated 60, shown in FIG. 3 is generally similar to the apparatus 10 shown in FIGS. 1 and 2 except that the ionized solution to be deionized is supplied through an external supply conduit 62 surrounding the apparatus 10 in spaced relationship thereto rather than having the apparatus 10 immersed in an open body of the ionized solution, for example, salt water such as in the open sea, as in FIGS. 1 and 2. Accordingly, the same principles apply and the desalinization apparatus 60 within the supply conduit 62 bears the same reference numerals as in FIG. 1 for the corresponding elements.

In the apparatus 60, however, the longitudinal portion 64 of the conduit 62 is provided with a bend 66 leading to a transverse portion 68 with an opening 70 therein corresponding to the opening 38 in the bulkhead 40. Beyond the opening 70, the conduit 12 is connected to a fresh water discharge conduit 72 leading to a place of disposal of the fresh water obtained. The arrangement of magnets in the modified apparatus 60 is the same as that in the apparatus 10 and the operation is also substantially the same. The ionized solution as before flows in the direction of the arrow J from the inlet passageway 74 within the supply conduit 62 and thence into the passageway 44 within the conduit 12 and, after desalinization, outward through the passageway 76, with the direction of flow again indicated by the reference letter K. The non-de-ionized water flowing beyond and outside the conduit 12 escapes through the passageway 78 in the bent section 58 of the conduit 62, in the direction indicated by the arrow L.

Figure 4:
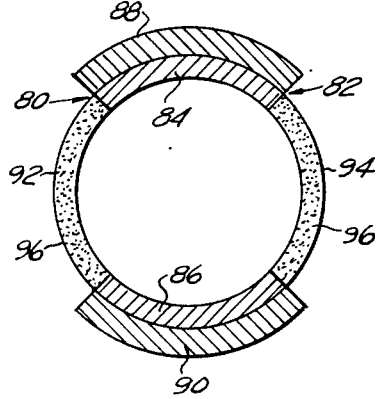
FIG. 4 is a cross-section through a further modification wherein the inner conduit is of circular rather than rectangular cross-section and the electromagnets and the field-restricting plates are of arcuate cross-section.
Figure 5:
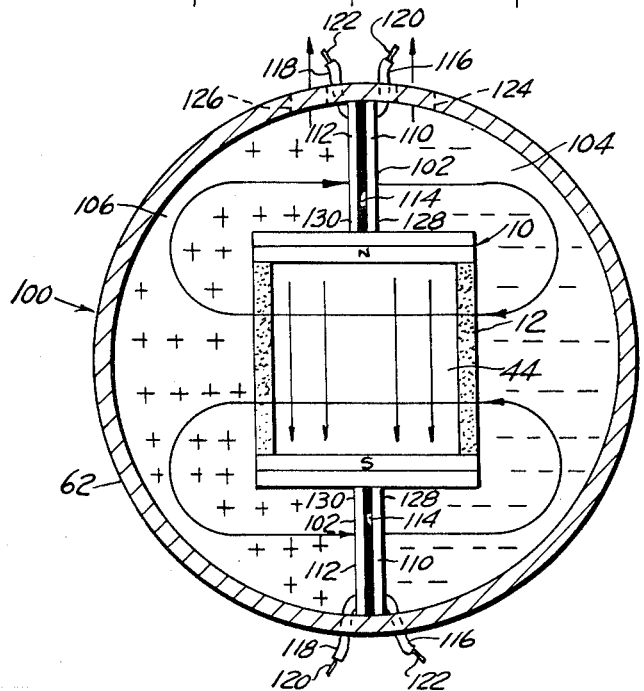
FIG. 5 is a cross-section through a still further modification of FIG. 3, wherein the space between the outer and inner conduits is partitioned by a diametral barrier composed of electrically-conducting walls separated by an insulating layer and adapted to deliver current electricity to an external circuit.

It will be understood that the flow of ionized solution through the conduit 12 in any form of the invention as shown in FIGS. 1 and 2, in FIG. 3, in FIG. 4, and in FIGS. 5 and 6 is preferably enhanced by the provision of suitable pumping means. Such pumping means is especially desirable in the modified apparatus shown in FIGS. 3, 5 and 6.

The further modified ion separation apparatus, generally designated 80, shown in FIG. 4 is the same in principle as the ion separation apparatus 10 in FIGS. 1, 2 and 3 and differs from these forms of the invention only in that its components are of circular or arcuate cross-section rather than of rectangular or straight cross-section. In particular, the conduit 82 is of annular cross-section having upper and lower walls 84 and 86 containing upstream and downstream permanent magnets 88 and 90 respectively. It will be understood that, as shown in FIG. 1, the permanent magnets 88 on the upper side and the magnets 90 on the lower side alternate in polarity the same as the upper side magnets 18 and 20 and the lower side magnets 22 and 24 in FIG. 1. As in FIGS. 1 and 2, the two remaining side walls 92 and 94 are of porous material, such as porous ceramic material like unglazed porcelain having minute pores indicated diagrammatically at 96 through which the ions of electrolytes such as the sodium and chlorine ions of sodium chloride solution can readily pass. The operation of the ion separation apparatus 80 of the FIG. 4 modification is substantially the same as that of FIGS. 1, 2 and 3 and hence requires no additional description.

The still further modified ion separation apparatus, generally designated 100, shown in FIGS. 5 and 6 is generally similar in construction to that shown in FIGS. 1, 2 and 3 and similar numerals are employed to designate similar parts. In the still further modified apparatus 100, however, a diametral composite partition 102 has been set up between the opposite sides of the external supply conduit 62 of FIG. 3 in order to provide a liquid-impenetrable barrier therebetween and provide two completely separated fluid passageways 104 and 106 on opposite sides thereof. Interflow between the opposite sides can of course take place upstream from the upstream end 108 of the ion separation apparatus 10 constituting the inner portion of the apparatus 100, but such interflow is effectively prevented downstream beyond the end 108 by the composite barrier 102 and continues throughout the length of the ion separation apparatus 10 beyond the upstream end 108 thereof.

The composite partition 102 above and below the ion separation apparatus 10 inside the conduit 62 consists of walls 110 and 112 of electrically conducting material spaced laterally apart from one another and separated in that space by a layer or wall 114 of electrically insulating material. Since electric current is generated in the operation of the apparatus 100, as will appear from the description thereof below, insulated conductors 116 and 118 respectively are connected to the walls 110 and 112 on opposite sides of the insulation layer 114 and their conducting cores 120 and 122 respectively may be connected to an external circuit to operate various electrical devices which are actuated by electric current. Added to the outer conduit 62 of FIG. 3 on opposite sides of the composite partition 102 are elongated gas discharge ports 124 and 126 respectively (FIG. 6) through which the gases generated during the operation of the apparatus 10 may escape. It will be evident to those skilled in this art that gas-conducting conduits may be coupled to the gas discharge ports 124 and 126 whereby the gases produced during the operation of the ion separation apparatus 100 may be carried away to a place of utilization or storage.

The operation of the still further modified ion separation apparatus 100 is substantially the same as that described above in connection with FIGS. 1, 2 and 3 and hence requires no repetition except for the additional actions resulting therefrom. The electrical conducting walls 110 and 112, preferably of metal, and separated by the insulating layer 114, act as anode and cathode respectively providing an electrical potential difference of voltage when an electrolyte is pumped through the inlet passageway 74 and thence through the passageway 44 within the inner conduit 12 and, after desalinization or ion separation, outward through the passageway 76. The non-de-ionized water flowing beyond and outside the conduit 12, however, instead of escaping through the passageway 78 of FIG. 3 now escapes through the divided and separate passageways 104 and 106. In addition, when the cores 120 and 122 of the insulated conductors 116 and 118 are short-circuited by being connected into an external electrical circuit to operate electrical devices constituting an electric load, the walls 110 and 112 provide surfaces 128 and 130 upon which gases and certain solids or solid compounds may either precipitate out of solution or remain in solution, as the case may be.

The still further modified ion separation apparatus 100 and the method practised by its use differs from the method of electrolysis in the types of energy transformation taking place therein. In the still further modified ion separation apparatus 100 of FIGS. 5 and 6, mechanical energy provided by the liquid pump (not shown) or other suitable source providing electrolytic flow performs work in separating the ions from the electrolyte passing through the inlet passageway 74 and thence through the ion separation passageway 44 into the outlet passageway 76 and converts these ions into gases, solids or various compounds, accompanied by the generation of electricity. In brief, in my apparatus 100, mechanical energy is converted into electrical energy and chemical potential energy.

In electrolysis, on the other hand, electrical energy is fed into electrolytic apparatus for the purpose of performing work on the ions in solution and thereby converting them into gases, solids or various compounds, thereby converting electrical energy into chemical potential energy.

From the foregoing description, it will be evident to those skilled in the art that the present apparatus and method, while described particularly with reference to the elimination from sea water of common salt (sodium chloride), is equally applicable to the elimination of the lesser salts present in sea water, and also for the separation of the ions from other ionized solutions, since the same scientific principles apply thereto.

I claim:

1. An apparatus for the separation of ions from an ionized solution, comprising a conduit having an internal passageway therein with an inlet adapted to be connected to a source of ionized solution arranged to flow through said passageway and having an outlet remote from said inlet, means disposed on two opposite sides of said conduit for setting up a magnetic field extending across said passageway in a direction transverse to the direction of flow of said ionized solution through said passageway, opposite walls extending between said opposite sides of said conduit having means associated therewith for the removal of the ions expelled across said passageway in response to the action of said magnetic field, a second conduit disposed externally of said first-mentioned conduit in laterally spaced relationship thereto providing an external passageway therealong, said second conduit being adapted to be connected to the source of ionized solution, said inlet of said first-mentioned conduit communicating with said external passageway of said second conduit, and means for pumping said ionized solution from said source through said internal and external passageways, said opposite walls of said first-mentioned conduit being of porous construction with pores capable of transmitting therethrough the ions expelled from said passageway.

2. An ion separation apparatus, according to claim 1, wherein said conduit is of approximately rectangular cross-section with two pairs of substantially parallel opposite walls, wherein said magnets are disposed adjacent one pair of said opposite walls, and wherein the means for removing the expelled ions includes the porosity of the other pair of said opposite walls.

3. An ion separation apparatus, according to claim 1, wherein a composite liquid-tight partition made up of two electrically conducting walls separated from one another by an electrically insulating layer is disposed between said first and second conduits and separates the intervening space therebetween into a plurality of separated liquid passageways, and wherein means is provided attached to said walls for connecting said walls to an external electric circuit.

4. An ion separation apparatus, according to claim 3, wherein gas outlet ports are provided in said first conduit for outward flow therethrough of gases released during the operation of said apparatus.

* * * * *